(12) United States Patent
Hencinski et al.

(10) Patent No.: US 12,519,737 B2
(45) Date of Patent: Jan. 6, 2026

(54) DEVICE AND METHOD FOR MULTI-LINK WIRELESS TRANSMISSIONS

(71) Applicant: HUAWEI TECHNOLOGIES CO., LTD., Shenzhen (CN)

(72) Inventors: Oren Hencinski, Hod Hasharon (IL); Ohad Klausner, Hod Hasharon (IL); Yotam Katzman, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 413 days.

(21) Appl. No.: 18/171,178

(22) Filed: Feb. 17, 2023

(65) Prior Publication Data

US 2023/0254921 A1    Aug. 10, 2023

Related U.S. Application Data

(63) Continuation of application No. PCT/EP2020/073227, filed on Aug. 19, 2020.

(51) Int. Cl.
  *H04W 76/00* (2018.01)
  *H04L 47/34* (2022.01)
  *H04W 76/15* (2018.01)

(52) U.S. Cl.
  CPC .............. *H04L 47/34* (2013.01); *H04W 76/15* (2018.02)

(58) Field of Classification Search
  None
  See application file for complete search history.

(56) References Cited

U.S. PATENT DOCUMENTS

| 2009/0213729 | A1  | 8/2009 | Zhang et al. |
| 2018/0184233 | A1  | 6/2018 | Alpert et al. |
| 2019/0207859 | A1* | 7/2019 | Schmidtke ............. H04L 47/27 |

(Continued)

FOREIGN PATENT DOCUMENTS

| JP | 2016123051 A  | 7/2016 |
| JP | 2019526179 A  | 9/2019 |
| WO | 2020146401 A1 | 7/2020 |

OTHER PUBLICATIONS

Son et al., "Experiments on Wireless VR for EHT," IEEE 802.11-18/1606r0, Total 12 pages (Sep. 10, 2018).

(Continued)

*Primary Examiner* — Abdelillah Elmejjarmi
(74) *Attorney, Agent, or Firm* — Leydig, Voit & Mayer, Ltd.

(57) ABSTRACT

The present disclosure relates to reduce latency in wireless communications. To this end, the disclosure proposes a first entity being configured to: transmit a first indication to a second entity, wherein the first indication indicates a first set of packets transmitted from the first entity to a first link receiver; and transmitting a first transmit status indication to the second entity, wherein the first transmit status indication indicates which packets of the first set of packets were successfully received by the first link receiver, and/or indicates which packets of the first set of packets were not received by the first link receiver. In particular, each packet indicated in the first indication and the first transmit status indication is associated with a global multi-link sequence number. Further, this disclosure also proposes a second entity being configured to receive a first indication and a first transmit status indication from a first entity.

17 Claims, 11 Drawing Sheets

(56) References Cited

U.S. PATENT DOCUMENTS

2022/0109638 A1    4/2022  Hencinski et al.
2022/0123868 A1*  4/2022  Han .................... H04L 1/1642

OTHER PUBLICATIONS

Kondo et al., "Discussion on Expansion of Multi-Link Aggregation to Multi-AP," IEEE 802. 11-20/0035r0., Total 9 pages (Jan. 8, 2020).

Patil et al., "Multi-Link Aggregation," IEEE 802.11-19/0000r0, Qualcomm Inc., Total 13 pages (Mar. 2019).

Chitrakar et al., "Multi-link Block Ack Architecture," IEEE 802. 11-20/0055r0, Total 11 pages (Jan. 10, 2020).

"IEEE Standard for Information technology-Telecommunications and information exchange between systems-Local and metropolitan area networks-Specific requirements Part 11: Wireless LAN Medium Access Control (MAC) and Physical Layer (PHY) specifications Amendment 8: Medium Access Control (MAC) Quality of Service Enhancements," IEEE Computer Society, IEEE Std 802.11eTM-2005, Total 211 pages (Nov. 2005).

* cited by examiner

DEVICE AND METHOD FOR MULTI-LINK WIRELESS TRANSMISSIONS

CROSS-REFERENCE TO RELATED APPLICATIONS

This application is a continuation of International Application No. PCT/EP2020/073227, filed on Aug. 19, 2020, the disclosure of which is hereby incorporated by reference in its entirety.

TECHNICAL FIELD

The present disclosure relates generally to wireless communications, and more particularly to multi-link aggregation in wireless transmissions. The disclosure discloses a device and method for low latency and strict delay wireless transmissions.

BACKGROUND

The IEEE 802.11 standard/protocol family, 802.11 for short, specifies a set of media access control (MAC) and physical layer (PHY) protocols for implementing wireless local area network (WLAN) Wi-Fi computer communication in various frequencies.

The 802.11 protocol family employs carrier-sense multiple access with collision avoidance (CSMA/CA). CSMA is a MAC protocol in which a node verifies the absence of other traffic before transmitting on a shared transmission medium, such as an electrical bus or a band of the electromagnetic spectrum. CSMA/CA in computer networking is a network multiple access method in which carrier sensing is used, but nodes attempt to avoid collisions by beginning transmission only after the channel is sensed to be "idle". Wi-Fi transmissions based on CSMA/CA include random back-off, thus a transmission opportunity (TxOP) timing cannot be guaranteed.

IEEE 802.11e, 802.11e or 11 e for short, has introduced an enhanced distributed channel access (EDCA) with four access categories. Each category is different from each other only by the random back-off window, which provides statistically higher priority to low latency traffic on top of other traffic.

Typical, residential Wi-Fi environment includes several access points (APs) sharing the same channel. However, overlapping basic service set (OBSS) transmission is not coordinated and there is no protocol for cooperation between APs. Thus, delay can be neither bounded nor guaranteed.

It is suggested to implement multi-link devices that operate in two different channels in parallel. However, one of the biggest challenges in such multi-link implementation is how to mitigate Simultaneous Transmit Receive (STR) problems between the two different channels on the same Wi-Fi chip.

SUMMARY

In view of the above-mentioned limitations, embodiments of the present disclosure aim to introduce a solution for mitigating OBSS time-sharing interference. In particular, an objective is to optimize air-winning opportunities. One aim is to achieve lower delay in wireless transmissions.

The objective is achieved by embodiments as provided in the enclosed independent claims. Advantageous implementations of the embodiments are further defined in the dependent claims.

Embodiments of this disclosure provide a software-based approach for STR multi-link implementation. In particular, software-based low latency messages (e.g., the first indication, and the first transmit status indication) are exchanged between the first entity and the second entity, in order to keep all links of the multi-link implementation synchronized.

A first aspect of the disclosure provides a first entity for multi-link implementation in a wireless network, the first entity being configured to: transmit a first indication to a second entity, wherein the first indication indicates a first set of packets transmitted from the first entity to a first link receiver; and transmit a first transmit status indication to the second entity, wherein the first transmit status indication indicates which packets of the first set of packets were successfully received by the first link receiver, and/or indicates which packets of the first set of packets were not received by the first link receiver, wherein each packet indicated in the first indication and the first transmit status indication is associated with a global multi-link sequence number.

In an embodiment of the first aspect, the first entity is further configured to: obtain a sequence of packets to be transmitted to the first link receiver, wherein each packet is associated with a global multi-link sequence number; and maintain a first transmit queue of the sequence of packets, wherein packets in the first transmit queue will be transmitted to the first link receiver.

Global multi-link sequence number is designed to identify a packet in multi-link implementation. In particular, the sequence of packets need to be transmitted in different links/channels of multi-link is identical. Each global multi-link sequence number identifies the same packet in different links. That is, the identical packets in different links share the same global multi-link sequence number. Notably, global multi-link sequence number is different from the conventional sequence number in wireless transmissions. In particular, the global multi-link sequence number may be set for each packet before the first entity obtains the packets.

In an embodiment of the first aspect, the first entity is further configured to: transmit the first set of packets to the first link receiver, wherein the first set of packets is included in the sequence of packets; receive a first block acknowledgement (BA), from the first link receiver, wherein the first BA indicates which packets of the first set of packets were successfully received by the first link receiver, and/or indicates which packets of the first set of packets were not received by the first link receiver; and generate the first transmit status indication based on the first BA and global multi-link sequence numbers associated with packets indicated in the first BA.

In response to the reception of packets, a receiver, e.g., the first link receiver, may transmit an acknowledgement message to a transmitter, e.g., the first entity. In this embodiment, the first link receiver may transmit a BA (to acknowledge a plurality of packets together using a single frame) to the first entity. Accordingly, the first entity may generate the first transmit status indication by adding global multi-link sequence numbers to packets indicated in the first BA. Notably, the BA may indicate the packets by indicating Wi-Fi sequence numbers of the packets.

In an embodiment of the first aspect, wherein each packet of the first set of packets comprises a wireless sequence number, and the first BA indicates which packets of the first set of packets were successfully received by the first link receiver, and/or indicates which packets of the first set of packets were not received by the first link receiver, by indicating the wireless sequence number of each packet.

Typically, each packet in wireless transmissions comprises a sequence number field indicating the sequence number of the packet. The BA may indicate received packets or missing packets using said sequence numbers.

In an embodiment of the first aspect, the first entity is further configured to: receive a second indication from the second entity, wherein the second indication indicates a second set of packets transmitted from the second entity to a second link receiver, wherein each packet indicated in the second indication is associated with a global multi-link sequence number, and the second set of packets is included in the sequence of packets; and in response to the second indication, move the second set of packets from the first transmit queue to a first on-hold queue, wherein packets in the first on-hold queue are put on hold.

A link between the second entity and the second link receiver is another link of the multiple channels/radios in the multi-link implementation. The second set of packets is included in the sequence of packets. That is, the second set of packets indicated by the second entity is also in the first transmit queue of the first entity. To avoid transmitting redundant packets, when a set of packets has been transmitted in one link, the other link(s) will be informed and will move out this set of packets from the transmit queue to the on-hold queue accordingly.

In an embodiment of the first aspect, the first entity is further configured to: receive a second transmit status indication from the second entity, wherein the second transmit status indication indicates which packets of the second set of packets were successfully received by the second link receiver, and/or indicates which packets of the second set of packets were not received by the second link receiver; in response to the second transmit status indication, release packets that were successfully received by the second link receiver from the first on-hold queue; and/or move packets that were not received by the second link receiver back to a front of the first transmit queue.

For packets that were successfully received by the receiver, e.g., the second link receiver, there is no need for the first entity to transmit these packets again. Thus, these packets may be released from the first on-hold queue. Notably, missing packet or packet that cannot be successfully decoded by the receiver needs to be retransmitted. Accordingly, these packets may be moved back to the first transmit queue. Preferably, these packets may be transmitted in the next TxOP.

In an embodiment of the first aspect, wherein the first entity is implemented on a first chipset and the second entity is implemented on a second chipset different from the first chipset.

As aforementioned, implementing STR multi-link on the same chipset is a huge challenge.

Thus, this embodiment proposes an alternative implementation that take place at software level. This solution is based on current multi-band products, which include external on-board high radio frequency (RF) separation between the two radios, while each radio uses independent chipset and RF chain.

In an embodiment of the first aspect, wherein the first chipset and the second chipset are placed on the same wireless device.

For instance, a Wi-Fi device may have two Wi-Fi chips connected (e.g. via PCIe) to the same host. Alternatively, the first chipset and the second chipset may be placed on two wireless devices.

In an embodiment of the first aspect, wherein the first chipset and the second chipset are placed on different wireless devices, and communicate with each other via a wired or wireless network backhaul connection.

In case the two wireless chipsets are not set on the same device, there may be a network backhaul connectivity between these two wireless chipsets. The backhaul connection may be either wired or wireless.

In an embodiment of the first aspect, wherein the first chipset operates at a frequency that is different from the second chipset.

Preferably, one of the two chipsets may operate at a higher frequency (e.g. 5 GHz high band), while the other chipset operates at a lower frequency (e.g. 5 GHz low band). Thereby, a better RF isolation can be achieved.

A second aspect of the disclosure provides a second entity for multi-link implementation in a wireless network, the second entity being configured to: receive a first indication from a first entity, wherein the first indication indicates a first set of packets transmitted from the first entity to a first link receiver; and receive a first transmit status indication from the first entity, wherein the first transmit status indication indicates which packets of the first set of packets were successfully received by the first link receiver, and/or indicates which packets of the first set of packets were not received by the first link receiver, wherein each packet indicated in the first indication and the first transmit status indication is associated with a global multi-link sequence number.

As aforementioned, embodiments of this disclosure propose to exchange software-based low latency messages (e.g., the first indication, and the first transmit status indication) between the first entity and the second entity, in order to keep all links of the multi-link implementation synchronized. In addition, a global multi-link sequence number is designed to identify a packet in multi-link implementation.

In an embodiment of the second aspect, the second entity is further configured to: obtain a sequence of packets that need to be transmitted to a second link receiver, wherein each packet is associated with a global multi-link sequence number; and maintain a second transmit queue of the sequence of packets, wherein packets in the second transmit queue will be transmitted to the second link receiver.

Notably, the global multi-link sequence number may be set for each packet before the second entity obtains the packets.

In an embodiment of the second aspect, wherein the first set of packets is included in the sequence of packets, and the second entity is further configured to: in response to the first indication, move the first set of packets from the second transmit queue to a second on-hold queue, wherein packets in the second on-hold queue are put on hold.

That is, the first set of packets indicated by the first entity is also in the second transmit queue of the second entity. When a set of packets has been transmitted in one link (as indicated in the first indication), the other link(s) (i.e., the second entity) will be informed and will move out this set of packets (i.e., the first set of packets) from the transmit queue accordingly. This is to avoid transmitting redundant packets.

In an embodiment of the second aspect, in response to the first transmit status indication, the second entity is further configured to: release packets that were successfully received by the first link receiver from the second on-hold queue; and/or move packets that were not received by the first link receiver back to a front of the second transmit queue.

Possibly, an over the air packet error may occur during the reception. Therefore, not received packets may be moved back to the transmit queue and wait for retransmissions. Preferably, these packets may be transmitted in the next TxOP.

In an embodiment of the second aspect, the second entity is further configured to: transmit a second set of packets to the second link receiver, wherein the second set of packets is included in the sequence of packets; receive a second BA from the second link receiver, wherein the second BA indicates which packets of the second set of packets were successfully received by the second link receiver, and/or indicates which packets of the second set of packets were not received by the second link receiver; and generate a second transmit status indication based on the second BA and global multi-link sequence numbers associated with packets indicated in the second BA.

Notably, a link between the second entity and the second link receiver is another link of the multiple channels/radios in the multi-link implementation. Once the second entity transmits the second set of packets, the first entity should be informed accordingly. Optionally, the second entity may generate the second transmit status indication by adding global multi-link sequence numbers to packets indicated in the second BA. This synchronizing message (i.e., the second transmit status indication) is used to inform the first entity regarding which packets were successfully transmitted, and which packets should be retransmitted.

In an embodiment of the second aspect, wherein each packet of the second set of packets comprises a wireless sequence number, and the second BA indicates which packets of the second set of packets were successfully received by the second link receiver, and/or indicates which packets of the second set of packets were not received by the second link receiver, by indicating the wireless sequence number of each packet.

Typically, each packet in wireless transmissions comprises a sequence number field indicating the sequence number of the packet. The second BA may indicate received packets or missing packets using said sequence numbers.

In an embodiment of the second aspect, the second entity is further configured to: transmit a second indication to the first entity, wherein the second indication indicates the second set of packets transmitted from the second entity to the second link receiver; and transmit a second transmit status indication to the first entity, wherein the second transmit status indication indicates which packets of the second set of packets were successfully received by the second link receiver, and/or indicates which packets of the second set of packets were not received by the second link receiver.

Optionally, the second set of packets may be in the first transmit queue of the first entity as well. To avoid transmitting redundant packets, when a set of packets (e.g., the second set of packets transmitted from the second entity) has been transmitted in one link, the other link(s) (e.g., the first entity) will be informed.

A third aspect of the disclosure provide a wireless transmitting device, in particular an access point in a wireless network, the wireless transmitting device comprising: at least one first entity according to the first aspect or any embodiments of the first aspect, and at least one second entity according to the second aspect or any embodiments of the second aspect, wherein the wireless transmitting device is configured to: obtain an original sequence of packets; generate a sequence of packets by adding a global multi-link sequence number to each packet of the original sequence of packets; and duplicate the sequence of packets and provide the sequence of packets to each of the at least one first entity and the at least one second entity.

Multi-link implementation may include a plurality of links. Embodiments of the disclosure propose a wireless transmitting device on which at least two chipsets are placed. Notably, when a packet has been transmitted in one channel, traffic information will be synchronized among all channels. In this way, the wireless transmitting device optimizes air-winning opportunity of all chipsets. Further, the delay can be dramatically decreased.

Embodiments of the wireless transmitting device of the third aspect may correspond to the embodiments of the first entity of the first aspect and the embodiments of the second entity of the second aspect described above. The wireless transmitting device of the third aspect and its embodiments achieve the same advantages and effects as described above for the first entity of the first aspect and its embodiments, and for the second entity of the second aspect and its embodiments.

A fourth aspect of the disclosure provide a wireless receiving device, in particular a station in a wireless network, the wireless receiving device comprising at least one first link receiver and at least one second link receiver, wherein the at least one first link receiver is configured to receive packets from at least one first entity according to the first aspect and any embodiments of the first aspect, and the at least one second link receiver is configured to receive packets from at least one second entity according to the second aspect and any embodiments of the second aspect, wherein the wireless receiving device is configured to: obtain a receiving stream by combining the packets received by the at least one first link receiver and the packets received by the at least one second link receiver.

Accordingly, embodiments of the disclosure further propose a wireless receiving device comprising at least two link receivers. The wireless receiving device unifies all links received by all link receivers to a signal receive stream, each receiver receiving packets from a corresponding chipset. Notably, the wireless receiving device may further send in order the combined stream to a next layer device.

Embodiments of the wireless receiving device of the fourth aspect may correspond to the embodiments of the first entity of the first aspect described and the embodiments of the second entity of the second aspect described above. The wireless receiving device of the fourth aspect and its embodiments achieve the same advantages and effects as described above for the first entity of the first aspect and its embodiments, and for the second entity of the second aspect and its embodiments.

A fifth aspect of the disclosure provides a method performed by a first entity, for multi-link implementation in a wireless network, wherein the method comprises: transmitting a first indication to a second entity, wherein the first indication indicates a first set of packets transmitted from the first entity to a first link receiver; and transmitting a first transmit status indication to the second entity, wherein the first transmit status indication indicates which packets of the first set of packets were successfully received by the first link receiver, and/or indicates which packets of the first set of packets were not received by the first link receiver, wherein each packet indicated in the first indication and the first transmit status indication is associated with a global multi-link sequence number.

Embodiments of the method of the fifth aspect may correspond to the embodiments of the first entity of the first aspect described above. The method of the fifth aspect and its embodiments achieve the same advantages and effects as described above for the first entity of the first aspect and its embodiments.

A sixth aspect of the disclosure provide a method performed by a second entity, for multi-link implementation in a wireless network, wherein the method comprises: receiving a first indication from a first entity, wherein the first indication indicates a first set of packets that are transmitted from the first entity to a first link receiver; and receiving a first transmit status indication from the first entity, wherein the first transmit status indication indicates which packets of the first set of packets were successfully received by the first link receiver, and/or indicates which packets of the first set of packets were not received by the first link receiver, wherein each packet indicated in the first indication and the first transmit status indication is associated with a global multi-link sequence number.

Embodiments of the method of the sixth aspect may correspond to the embodiments of the second entity of second aspect described above. The method of the sixth aspect and its embodiments achieve the same advantages and effects as described above for the second entity of the second aspect and its embodiments.

A seventh aspect of the disclosure provide a computer program product comprising a program code for carrying out, when implemented on a processor, the method according to the fifth aspect and any embodiments of the fifth aspect, or the sixth aspect and any embodiments of the sixth aspect.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and embodiments of the present disclosure will be explained in the following description of specific embodiments in relation to the enclosed drawings, in which.

DETAILED DESCRIPTION OF EMBODIMENTS

Illustrative embodiments of methods, devices, and program product for efficient packet transmission in a communication system are described with reference to the figures. Although this description provides a detailed example of possible embodiments, it should be noted that the details are intended to be exemplary and in no way limit the scope of the application.

Moreover, an embodiment/example may refer to other embodiments/examples. For example, any description including but not limited to terminology, element, process, explanation and/or technical advantage mentioned in one embodiment/example is applicative to the other embodiments/examples.

Multi-link/Multi Radio MAC (MRM) are targeting OBSS time-sharing interference on the same primary channel (e.g., 20/40/80/160/320 MHz). By using in parallel at least one additional channel, AP can transmit to the station while a first channel is occupied by OBSS or Uplink from its own BSS. In the same manner, the AP will transmit on the first channel while the other channel is occupied by OBSS/Uplink from its own BSS. In this way, the AP optimizes the air-winning opportunity and dramatically decreases the delay in wireless transmissions.

A known solution proposes a hardware-based STR approach implemented at the baseband level. However, implementing multi-link (or can be named as multi-radio) baseband within single die (chip) is facing a huge technical implementation issue of STR. In such flow while one radio is in Receive (Rx), a Transmit (Tx) signal in the other radio, which may populate into the first radio receiver, will lead to Rx error. In order to overcome such Rx error, a high isolation between the radios is required. Beside the technical implementation challenge of such isolation, it also leads to additional costs, which most vendors would like to avoid. Thus, implementing STR multi-link on the same chipset is a huge challenge.

Embodiments of this disclosure propose an alternative implementation, which take place at software level. This software-based multi-link can be implemented based on current multi-band products, which include external on-board high radio frequency (RF) separation between two radios. Each radio is using independent chipset and RF chain. For example, concurrent multi-radio devices, which include 2*5 GHz working in "STR" mode, can be used.

Figure 1:
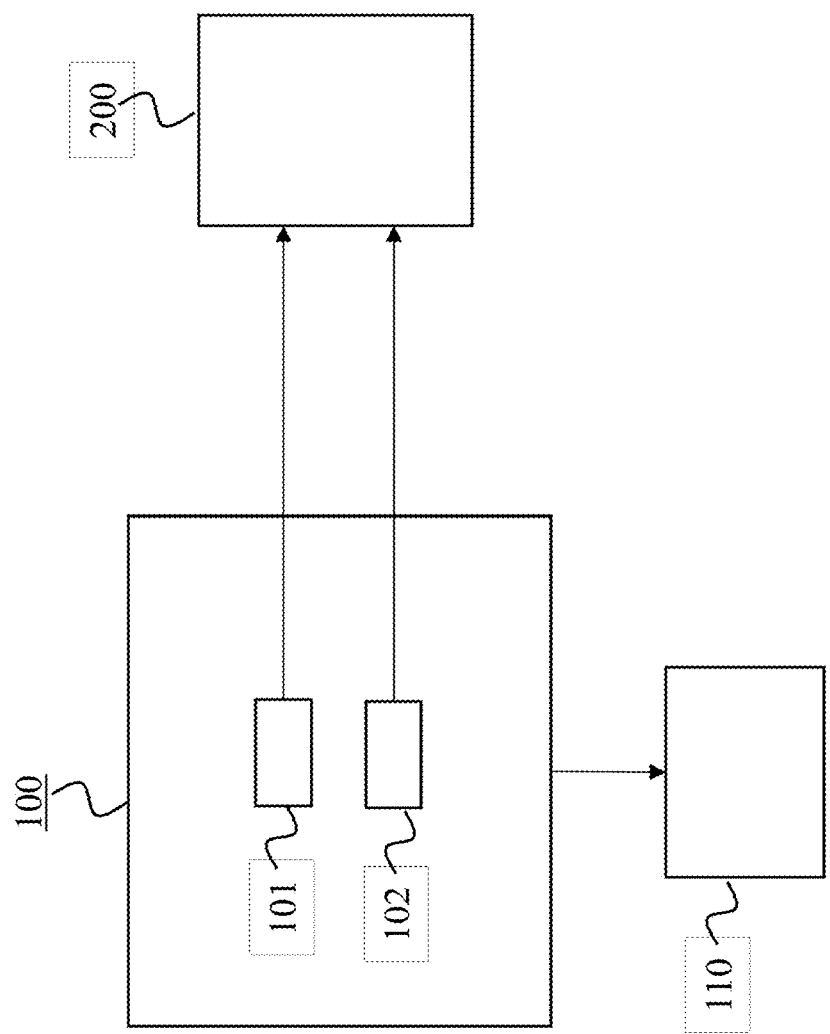
FIG. 1 shows a first entity according to an embodiment of the disclosure.

FIG. 1 shows a first entity 100 according to an embodiment of the disclosure. The first entity 100 may comprise processing circuitry (not shown) configured to perform, conduct or initiate the various operations of the first entity 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The first entity 100 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the first entity 100 to be performed. In one embodiment, the processing circuitry comprises one or more processors and a non-transitory memory connected to the one or more processors. The non-transitory memory may carry executable program code which, when executed by the one or more processors, causes the first entity 100 to perform, conduct or initiate the operations or methods described herein.

In particular, the first entity 100 is designed for multi-link implementation in a wireless network. The first entity 100 is configured to transmit a first indication 101 to a second entity 200. The second entity 200 is also designed for multi-link implementation in a wireless network. In particular, the first indication 101 indicates a first set of packets transmitted from the first entity 100 to a first link receiver 110 in the wireless network. The first entity 100 is further configured to transmit a first transmit status indication 102 to the second entity 200, wherein the first transmit status indication 200 indicates which packets of the first set of packets were successfully received by the first link receiver 110, and/or indicates which packets of the first set of packets were not received by the first link receiver 110. In particular, each packet indicated in the first indication 101 and the first transmit status indication 102 is associated with a global multi-link sequence number.

To address the aforementioned challenges, embodiments of this disclosure aim to provide a software-based approach for STR multi-link and to achieve lower delay. In particular, software-based low latency messages (e.g., the first indication 101, and the first transmit status indication 102) are exchanged between the first entity 100 and the second entity 200, in order to keep all links of the multi-link implementation synchronized.

This disclosure designs a new layer that manages link traffic to multiple independent MACs/PHYs (i.e., multiple entities such as the first entity 100 and the second entity 200). Exchanged messages enable synchronizing between the MAC Queues of multiple entities. In particular, when a set of packets has been transmitted in one link (e.g., the link between the first entity 100 and the first link receiver 110), the other link(s) (e.g., the second entity 200) will be informed. These messages (e.g., the first indication 101 and the first transmit status indication 102) allow the second entity 200 to avoid transmitting redundant packets.

Notably, the global multi-link sequence number is designed to identify a packet in multi-link, which is regardless to a Wi-Fi Tx sequence number. In particular, the global multi-link sequence number may be set for each packet before the first entity 100 obtains the packets.

Optionally, according to an embodiment of the disclosure, the first entity 100 may be configured to obtain a sequence of packets to be transmitted to the first link receiver 110, wherein each packet is associated with a global multi-link sequence number. The first entity 100 may be further configured to maintain a first transmit queue of the sequence of packets, wherein packets in the first transmit queue will be transmitted to the first link receiver 110. Notably, the link between the first entity 100 and the first link receiver 110 is one of the multiple channels/radios in the multi-link implementation.

In multi-link implementation, the first entity 100 may obtain to-be-transmit packets from a host device. In particular, the host device may duplicate the to-be-transmit packets, and provide a copy to the first entity 100. In particular, the to-be-transmit packets in different links/channels of multi-link are identical to each other. That is, the host device may provide another copy of the to-be-transmit packets to a transmitter of another link, such as the second entity 200. Each global multi-link sequence number identifies the same packet in different links. That is, the identical packets in different links (e.g., the link between the first entity 100 and the first link receiver 110, and the link between the second entity 200 and the second link receiver 210) share the same global multi-link sequence number.

According to an embodiment of the disclosure, after obtaining the sequence of packets, the first entity 100 may be further configured to transmit the first set of packets to the first link receiver 110. The first set of packets is included in the sequence of packets. Typically, in response to the reception of the first set of packets, the first link receiver 110 may transmit an acknowledgement message, particularly a BA (to acknowledged a plurality of packets together using a single frame), to the first entity 100. Accordingly, the first entity 100 may be configured to receive a first BA from the first link receiver 110, wherein the first BA indicates which packets of the first set of packets were successfully received by the first link receiver 110, and/or indicates which packets of the first set of packets were not received by the first link receiver 110.

It should be noted that, in wireless transmissions, each packet comprises a sequence number field indicating the sequence number of the packet. Typically, a BA may indicate received packets or missing packets using sequence numbers. Therefore, according to an embodiment of the disclosure, each packet of the first set of packets may comprise a wireless sequence number, and the first BA indicates which packets of the first set of packets were successfully received by the first link receiver 110, and/or indicates which packets of the first set of packets were not received by the first link receiver 110, by indicating the wireless sequence number of each packet.

Optionally, the first entity 100 may be further configured to generate the first transmit status indication 102 based on the first BA and global multi-link sequence numbers associated with packets indicated in the first BA. That is, the global multi-link sequence number is built on top of the wireless sequence number. For instance, the host device that provides the sequence of packet to the first entity 100, may add a global multi-link sequence number to each packet during the previously mentioned duplication process.

The global multi-link sequence number is a different number from the wireless sequence number. This disclosure proposes a solution in which each wireless link is operating independently. Each link manages its own wireless sequence number. Therefore, a new sequence number in higher level, i.e., the global multi-link sequence number, is provided for synchronizing the transmission status of identical packets in the different links.

Further, according to an embodiment of the disclosure, the first entity 100 may be further configured to receive a second indication from the second entity 200. The second indication may indicate a second set of packets transmitted from the second entity 200 to a second link receiver 210. It should be understood that, the link between the second entity 200 and the second link receiver 210 is another link of the multiple channels/radios in the multi-link implementation. Similar as the previous embodiments, each packet indicated in the second indication may also be associated with a global multi-link sequence number.

According to this embodiment, the second set of packets is included in the sequence of packets. That is, the second set of packets indicated by the second entity is also in the first transmit queue of the first entity 100. The first entity 100 may be further configured to, in response to the second indication, move the second set of packets from the first transmit queue to a first on-hold queue, wherein packets in the first on-hold queue are put on hold. Generally speaking, packets in the transmit queue of a transmitter will be transmitted to a receiver in sequence. According to embodiments of this disclosure, when a set of packets has been transmitted in one link, the other link(s) will be informed and will move out this set of packets from the transmit queue accordingly, thus avoiding transmitting redundant packets.

Notably, packet error may occur during transmissions. Failed packet (packet that cannot be successfully decoded by the receiver) needs to be retransmitted. According to an embodiment of the disclosure, the first entity 100 may be further configured to receive a second transmit status indication from the second entity 200, wherein the second transmit status indication indicates which packets of the second set of packets were successfully received by the second link receiver 210, and/or indicates which packets of the second set of packets were not received by the second link receiver 210.

For packets that were successfully received by the receiver, e.g., the second link receiver 210, there is no need for the first entity 100 to transmit these packets. Optionally, the first entity 100 may be further configured to, in response to the second transmit status indication, release packets that were successfully received by the second link receiver 210 from the first on-hold queue. On the other side, packets that were not received by the receiver, need to be retransmitted. Optionally, the first entity 100 may be further configured to move packets that were not received by the second link receiver 210 back to a front of the first transmit queue. Preferably, these packets may be transmitted in the next TxOP.

Figure 2:
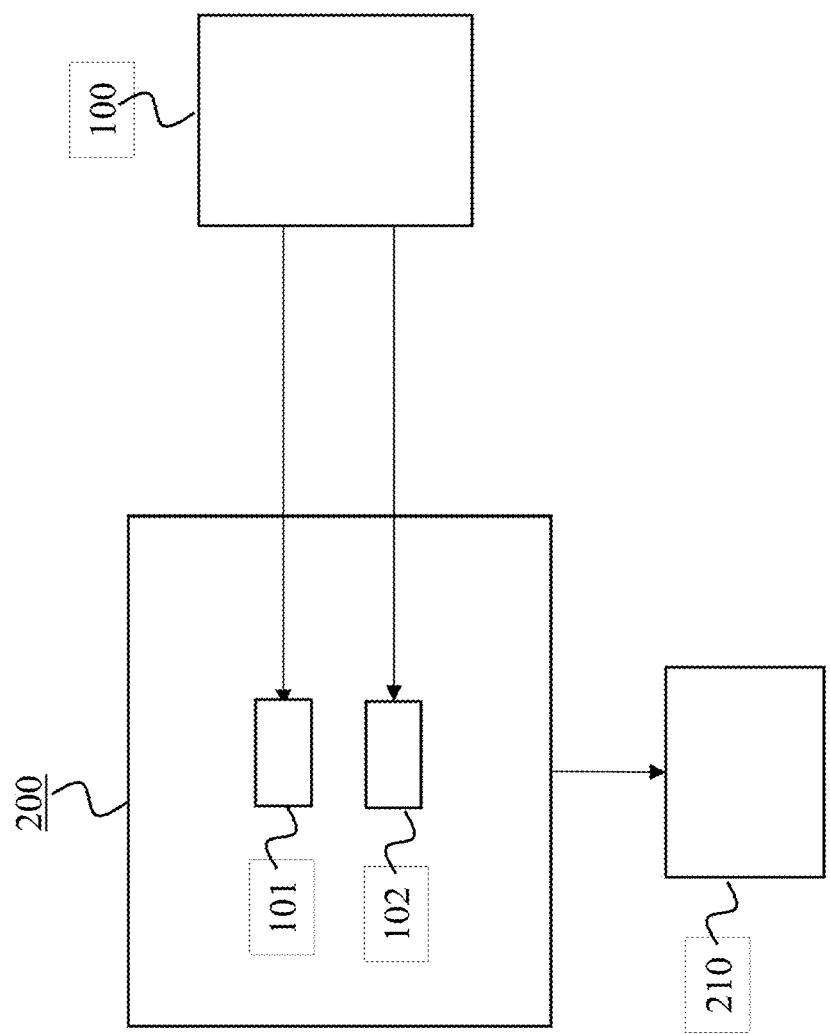
FIG. 2 shows a second entity according to an embodiment of the disclosure.

FIG. 2 shows a second entity 200 according to an embodiment of the disclosure. The second entity 200 may comprise processing circuitry (not shown) configured to perform, conduct or initiate the various operations of the second entity 200 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The second entity 200 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the second entity 200 to be performed. In one embodiment, the processing circuitry comprises one or more processors and a non-transitory memory connected to the one or more processors. The non-transitory memory may carry executable program code which, when executed by the one or more processors, causes the second entity 200 to perform, conduct or initiate the operations or methods described herein.

In particular, the second entity 200 shown in FIG. 2 is designed for multi-link implementation in a wireless network. The second entity 200 is configured to receive a first indication 101 from a first entity 100. The first entity 100 shown in FIG. 2 may be the first entity shown in FIG. 1. In particular, the first indication 101 indicates a first set of packets transmitted from the first entity 100 to a first link receiver 110. The second entity 200 is further configured to receive a first transmit status indication 102 from the first entity 100, wherein the first transmit status indication 101 indicates which packets of the first set of packets were successfully received by the first link receiver 110, and/or indicates which packets of the first set of packets were not received by the first link receiver 110. In particular, each packet indicated in the first indication 101 and the first transmit status indication 102 is associated with a global multi-link sequence number.

According to an embodiment of the disclosure, the second entity 200 may be configured to obtain a sequence of packets that need to be transmitted to a second link receiver 210, wherein each packet is associated with a global multi-link sequence number; and maintain a second transmit queue of the sequence of packets, wherein packets in the second transmit queue will be transmitted to the second link receiver 210.

As discussed in previous embodiments, a host device may duplicate to-be-transmit packets, and provide a copy to the first entity 100. Since the second entity need to transmit the same packets, the host device may also provide a copy of the to-be-transmit packets to the second entity 200.

With a knowledge of the to-be-transmit packets, i.e., the sequence of packets, and the first set of packets indicated in the first indication 101, the second entity 200 may be further configured to move the first set of packets from the second transmit queue to a second on-hold queue. Notably, the first set of packets is included in the sequence of packets. Since the first set of packets has been transmitted in one link (by the first entity 100), to avoid transmitting redundant packets, the second entity 200 should put the first set of packet on hold.

For packets of the first set of packets that were successfully received by the receiver, e.g., the first link receiver 110, there is no need for the second entity to transmit these packets again. Thus, these packets may be released from the second on-hold queue. Notably, packet that cannot be successfully decoded by the receiver needs to be retransmitted. Accordingly, the second entity 200 may move back these packets to the second transmit queue. Preferably, these packets may be transmitted in the next TxOP.

Optionally, according to an embodiment of the disclosure, in response to the first transmit status indication 102, the second entity 200 may be further configured to release packets that were successfully received by the first link receiver 110 from the second on-hold queue. Optionally, the second entity 200 may be further configured to move packets that were not received by the first link receiver 110 back to a front of the second transmit queue.

Further, according to an embodiment of the disclosure, the second entity 200 may be configured to transmit a second set of packets to the second link receiver 210. Notably, the second set of packets is included in the sequence of packets. Accordingly, the second entity 200 may be further configured to receive a second BA from the second link receiver 210, wherein the second BA indicates which packets of the second set of packets were successfully received by the second link receiver 210, and/or indicates which packets of the second set of packets were not received by the second link receiver 210. To inform the first entity 100 about a transmission status in the link between the second entity 200 and the second link receiver 210, a second transmit status indication may be generated, by the second entity 200, based on the second BA and global multi-link sequence numbers associated with packets indicated in the second BA.

It should be understood, each packet of the second set of packets comprises a wireless sequence number, and the second BA indicates which packets of the second set of packets were successfully received by the second link receiver 210, and/or indicates which packets of the second set of packets were not received by the second link receiver 210, by indicating the wireless sequence number of each packet.

Optionally, the second entity 200 may be further configured to transmit a second indication to the first entity 100. The second indication indicates the second set of packets transmitted from the second entity to 200 the second link receiver 210. The second entity 200 may be further configured to transmit the second transmit status indication to the first entity 100, wherein the second transmit status indication indicates which packets of the second set of packets were successfully received by the second link receiver 210, and/or indicates which packets of the second set of packets were not received by the second link receiver 210.

Figure 3:
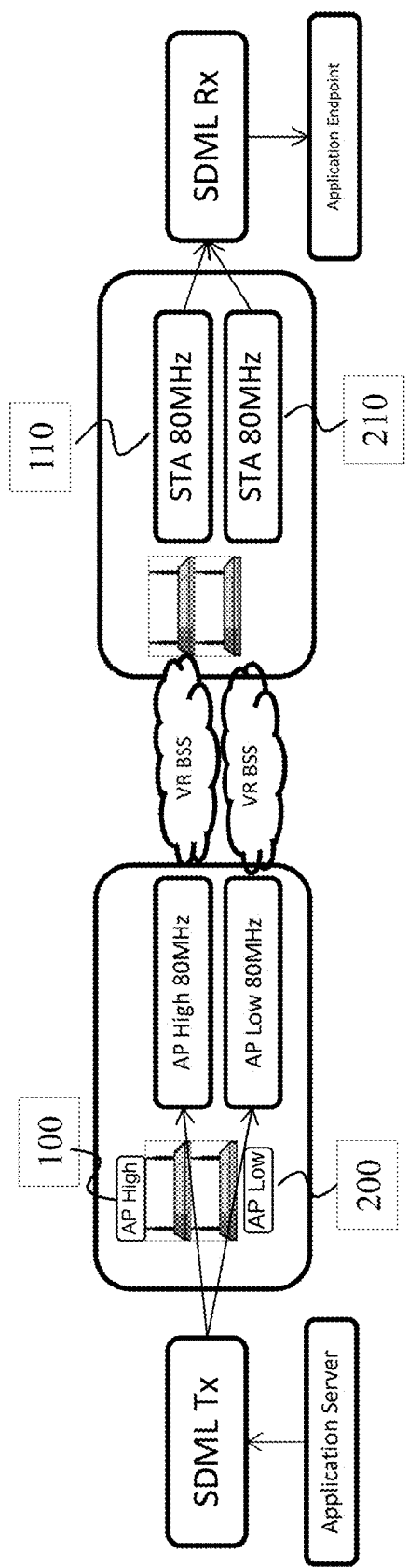
FIG. 3 shows a multi-link implementation according to an embodiment of the disclosure.

FIG. 3 shows a multi-link implementation according to an embodiment of the disclosure. An embodiment of the disclosure defines a MRM Tx device including a first entity 100 and a second entity 200. In particular, the first entity 100 may be the first entity shown in FIG. 1 or 2, and the second entity 200 may be the second entity shown in FIG. 1 or FIG. 2. The MRM Tx device may obtain traffic from a cloud (e.g., a cloud virtual reality (VR) server), and provide to-be-transmitted packets to both of the first entity 100 and the second entity 200. In this embodiment, the first entity 100 is an AP operating at high 80 MHz, while the second entity 200 is an AP operating at low 80 MHz. Each of the first entity 100 and the second entity 200 transmits to a respective station (STA). According to an embodiment of the disclosure, a MRM Rx device may combine traffic from two STAs to get an Rx stream, and may further feed in order this Rx stream to a terminal (e.g., a VR headset).

For the simplicity, FIG. 3 describes two Wi-Fi chipsets placed at the same housing, but there is no restriction to implement this design between two independent Wi-Fi products (different boxes). In addition, it is worth mentioning that, although FIG. 3 shows only two Wi-Fi chipsets at the host, this disclosure does not limit the number of the chipsets in multi-link implementation. That is, embodiments of this disclosure provide a wireless transmitting device that may comprise at least one first entity 100 as shown in FIG. 1, and at least one second entity 200 as shown in FIG. 2.

According to an embodiment of the disclosure, the wireless transmitting device may be configured to obtain an original sequence of packets (to-be-transmitted packets). Further, the wireless transmitting device may be configured to generate a sequence of packets by adding a global multi-link sequence number to each packet of the original sequence of packets. Then, the wireless transmitting device may be configured to duplicate the sequence of packets and provide the sequence of packets to each of the at least one first entity 100 and the at least one second entity 200.

Similarly, embodiments of this disclosure also provide a wireless receiving device that may comprise at least one first link receiver 110 receiving packets from at least one first entity 100 as shown in FIG. 1, and at least one second link receiver 210 receiving packet from at least one second entity 200 as shown in FIG. 2. According to an embodiment of the disclosure, the wireless receiving device may be configured to obtain a receiving stream by combining the packets received by the at least one first link receiver 110 and the packets received by the at least one second link receiver 210.

Figure 4:
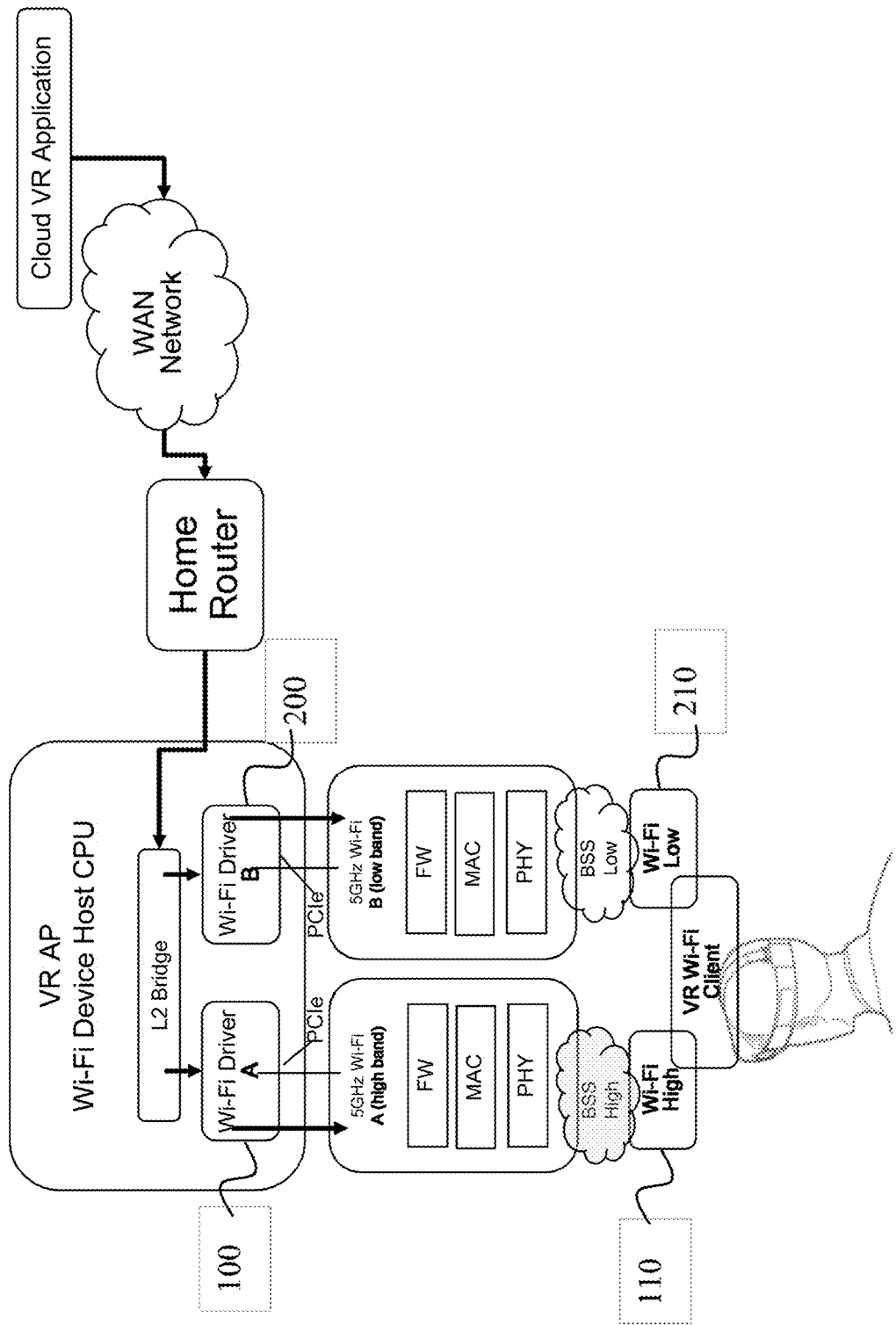
FIG. 4 shows a multi-link implementation according to an embodiment of the disclosure.

FIG. 4 shows a VR multi-link implementation according to an embodiment of the disclosure. Notably, VR requires high throughput (e.g., 80 Mbps for entry level, and 260 Mbps for comfort level) and also strict and bounded delay. Thus, VR over wireless transmission faces great challenges. The challenges include: guarantee the throughput while working in real deployment; facing real deployment air sharing with other devices at home; and facing interference from other Wi-Fi system working on the same frequency or adjacent/alternate frequencies.

In an ideal clean and isolated environment, Wi-Fi may meet the delay requirements of VR. However, in residential deployment, there is a very high probability that in some access attempts, the VR AP will face OBSS long Tx or several Tx for more than 10 ms and won't be able to go on Tx.

With the software level solution proposed in embodiments of this disclosure, each radio is using an independent chipset and RF chain. A high RF separation between the two radios can be achieved based on current multi-band products. For example, concurrent multi-radio devices, which include 2*5 GHz working in "STR" mode, can be used.

In this embodiment, a VR Wi-Fi device has two Wi-Fi chips connected (e.g. via PCIe) to the same host. In particular, Wi-Fi chip A may be the first entity 100 as shown in FIG. 1 or 2; while Wi-Fi chip B may be the second entity 200 as shown in FIG. 1 or 2. Wi-Fi chip A is working on 5 GHz High band, while Wi-Fi chip B is working on 5 GHz Low band. The host operation system (OS) may be Linux or any other OS (not strict real time OS). The traffic can be internally duplicated per Wi-Fi driver by using zero copy operation (e.g., using such as sk_buff_clone).

Figure 5:
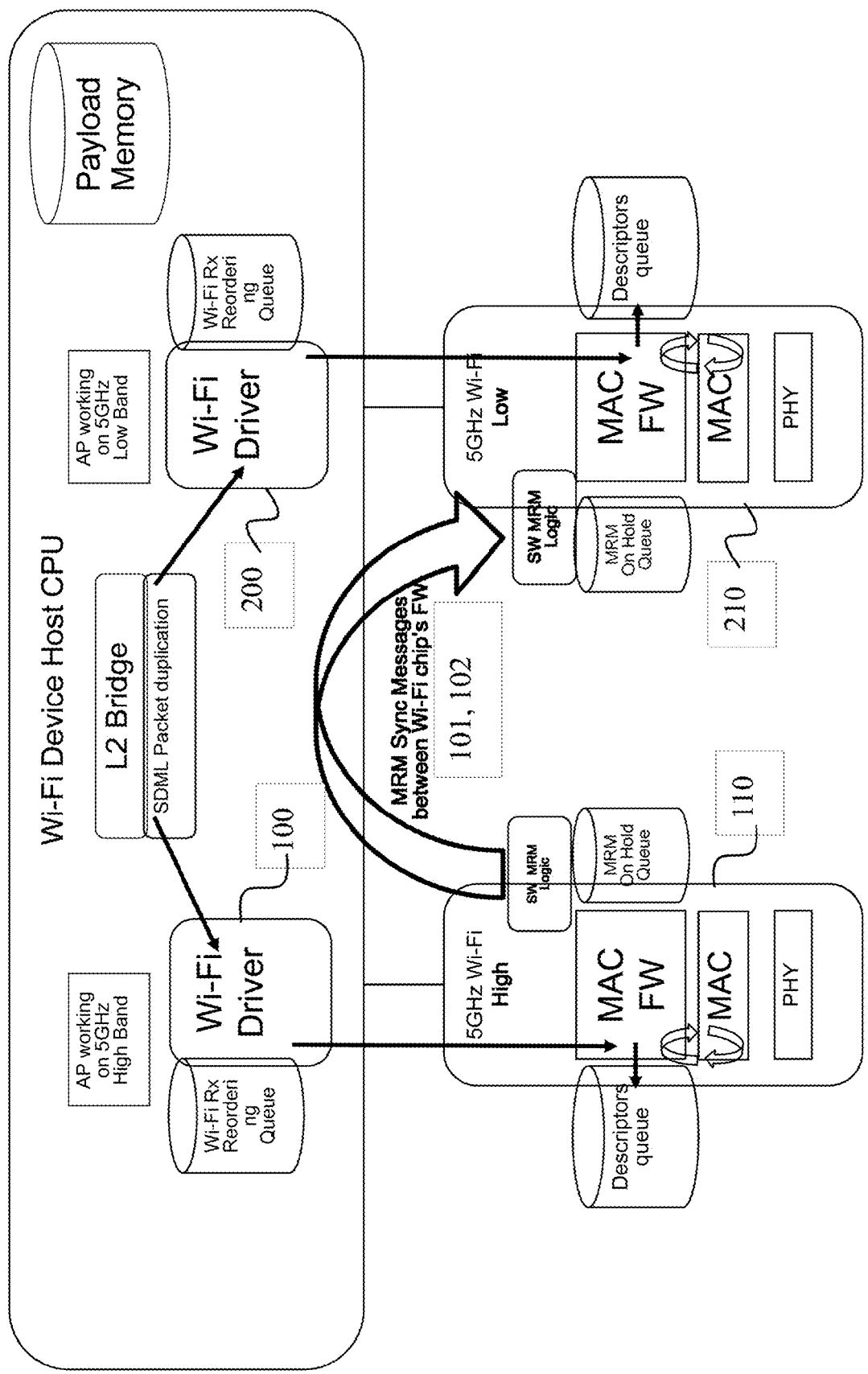
FIG. 5 shows a block diagram of a multi-link implementation according to an embodiment of the disclosure.
Figure 6:
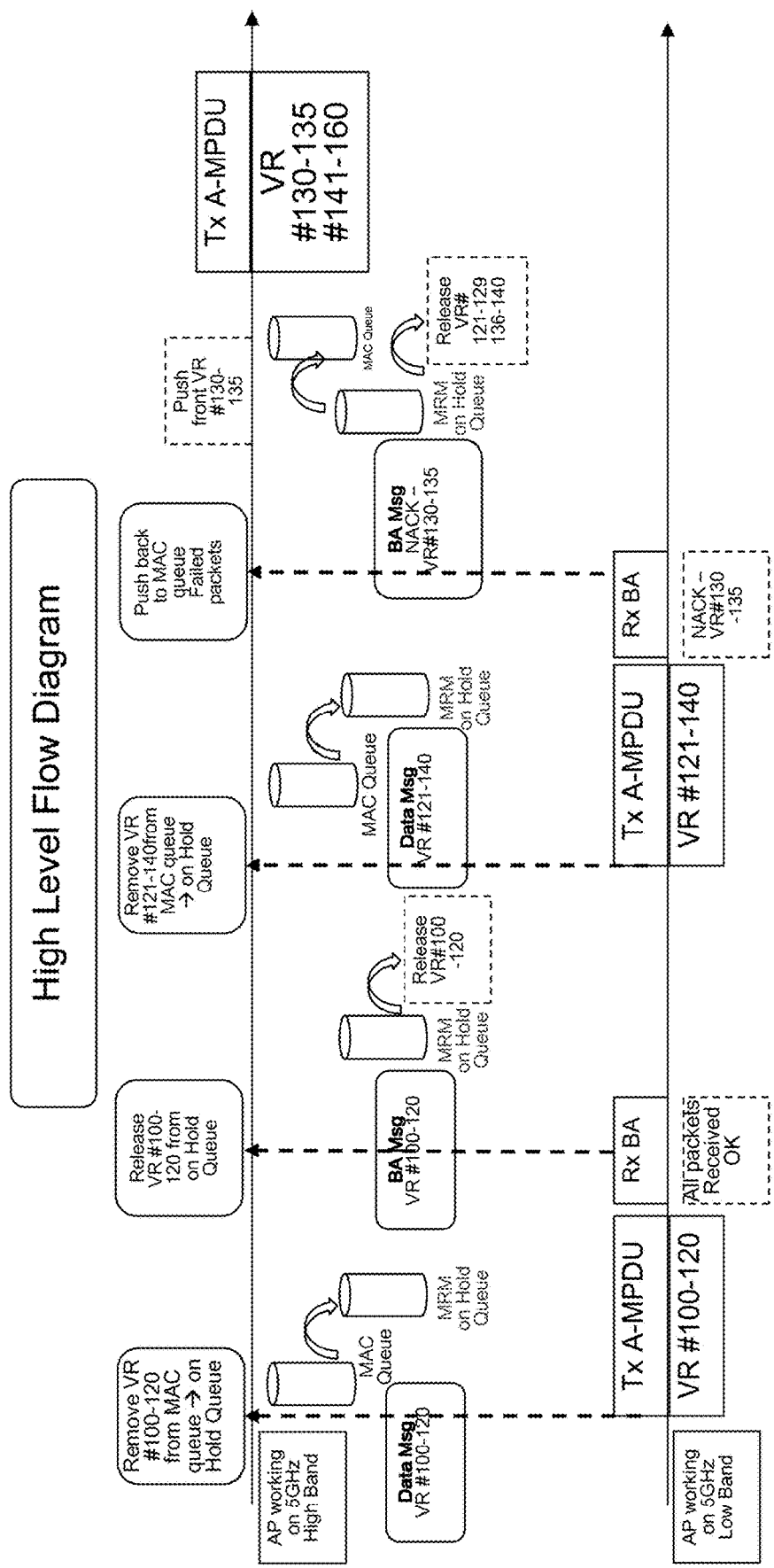
FIG. 6 shows a high-level flow diagram according to an embodiment of the disclosure.

FIG. 5 shows a block diagram of a software defined multi-link (SDML) architecture according to an embodiment of the disclosure, and FIG. 6 shows a high-level flow diagram of this architecture. For the simplicity, the block diagram of FIG. 5 describes two Wi-Fi chipsets placed at the same housing, but there is no restriction to implement SDML between two independent Wi-Fi products (different boxes), in which the SDML bridge logic is implemented at 3rd traffic manager/controller device. Notably, one of the Wi-Fi chipsets may be the first entity 100 as shown in FIG. 1 or 2, and the other one of the Wi-Fi chipsets may be the second entity 200 as shown in FIG. 1 or 2.

An efficient messaging infrastructure (e.g., Message (Msg) Queue) should be implemented between the two Wi-Fi chips. Due to software-based implementation requirement, the messages must pass via the host. When multi-link traffic is received by the bridge level SDML logic, it will get global multi-link sequence number (regardless to Wi-Fi Tx sequence number), and will duplicate among all SDML Tx Links.

SDML Architecture is based on two main messages that are keeping all links synchronized: Data Sent (i.e., the first indication 101 as shown in FIG. 1, FIG. 2 or FIG. 5)—indicating which packets were transmitted by link transmitter; and BA Received (i.e., the first transmit status indication 102 as shown in FIG. 1, FIG. 2 or FIG. 5)—indicating which packets were successfully received by the link receiver. When SDML device receives a SDML Data Sent Msg from another SDML link transmitter, such as "Data Msg SDML SN #100-120" as shown in FIG. 6, it should look for the indicated packets and take out of the wait for transmit queue to the SDML on-hold queue, as shown in FIG. 6. When SDML device receives a SDML BA Msg from another SDML link transmitter, such as "BA Msg SDML SN #100-120" as shown in FIG. 6, it should look for the indicated successful received packets in the SDML On-hold queue and dismiss them. While all the indicated failed packets should be placed back in the head of the wait for transmit queue, to be transmitted in the next TxOP. For instance, when SDML device receives a "Data Msg SDML SN #121-140" and further a "BA Msg NACK SDML SN #130-135", as shown in FIG. 6, it knows that packets with SDML SN #130-135 need to be retransmitted. Accordingly, the SDML device will release the packets with SDML SN #121-129 and 136-140, and push the packets with SDML SN #130-135 back to the front of the transmit queue.

Figure 7:
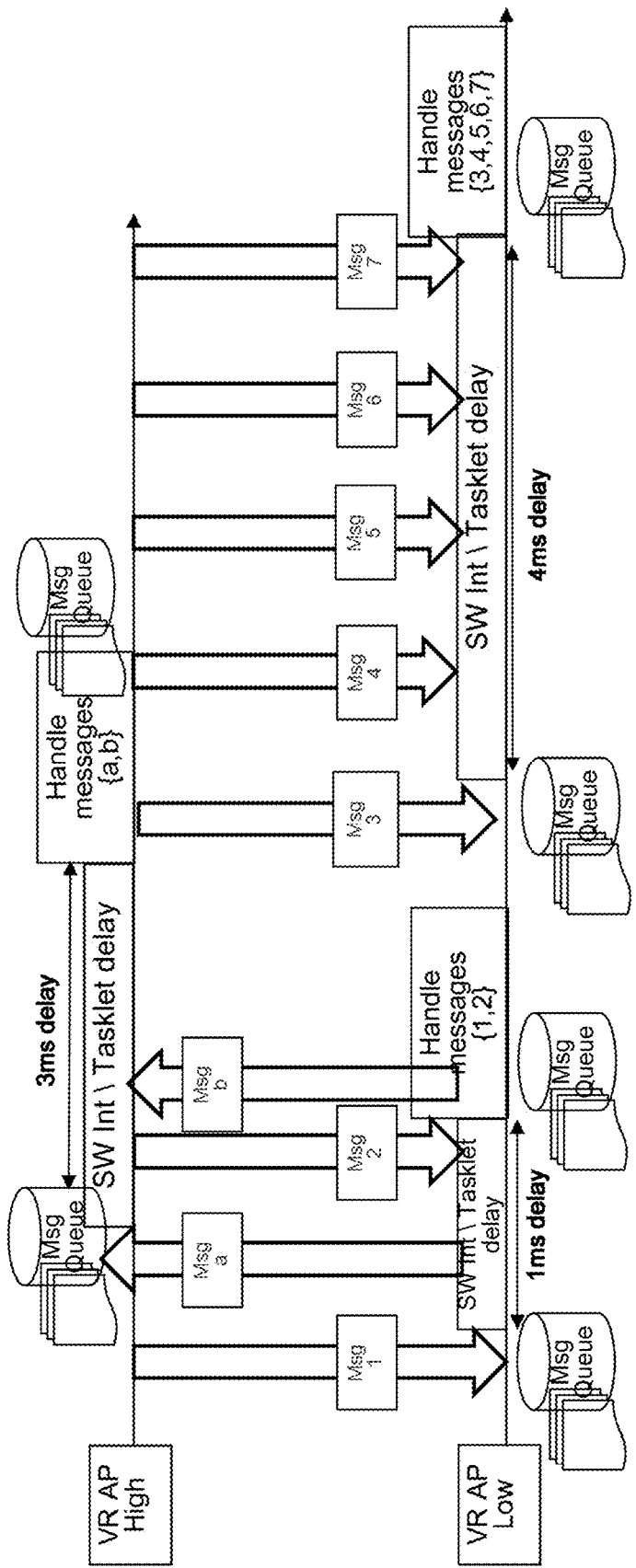
FIG. 7 shows a delay modelling according to an embodiment of the disclosure.

FIG. 7 further shows a delay modelling according to this embodiment of the disclosure. Notably, NS-3 is picking per message event randomly. Exponential distribution modeling is the industry common practice for software interrupt latency modeling. NS-3 exponential distribution argument is mean and bound. Bound of 10 ms with different mean values between 0.5-3 ms have been simulated.

Figure 8:
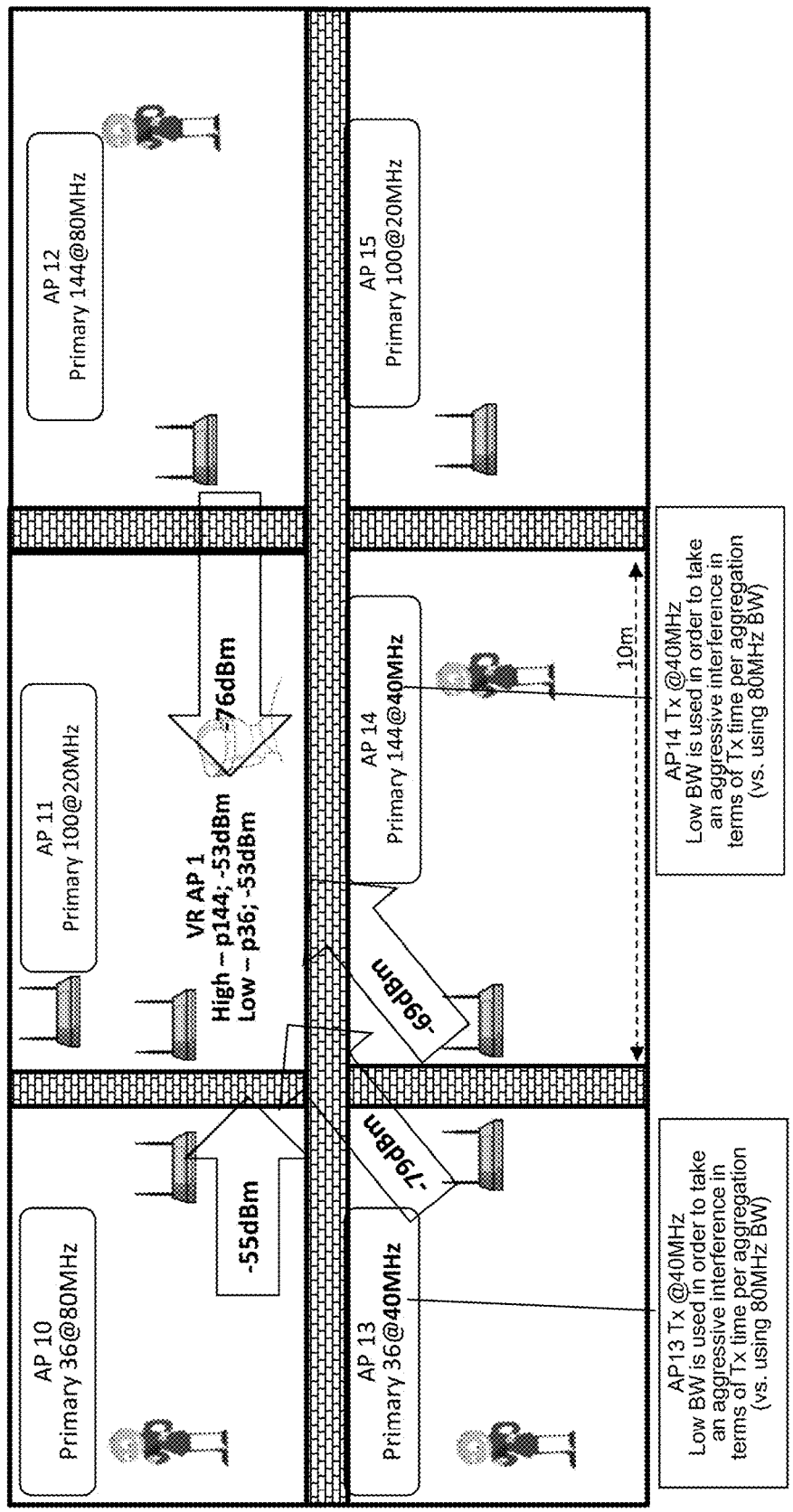
FIG. 8 shows a topology of a network simulator (NS-3) according to an embodiment of the disclosure.

FIG. 8 shows a NS-3 topology according to an embodiment of the disclosure. SDML is simulated on the open source NS-3 system level simulation:

SDML AP
- 250 Mbps—constant bit rate (CBR) User Datagram Protocol (UDP) Traffic
- modulation and coding scheme (MCS-4) (16-QAM 3/4), 3SS, 80 MHz->PHY rate 526.5 Mbps
- Tx Power 25 dBm
- Msg Queue Delay—Exponential distribution
  - bound—10 ms (max tail)
  - mean {0.5, 1.0, 1.5, 2.0, 2.5, 3.0}ms
  - simulation run duration—5 sec (5 sec was used so the NS-3 could have enough events for spread over the exponential distribution)

Figure 9:
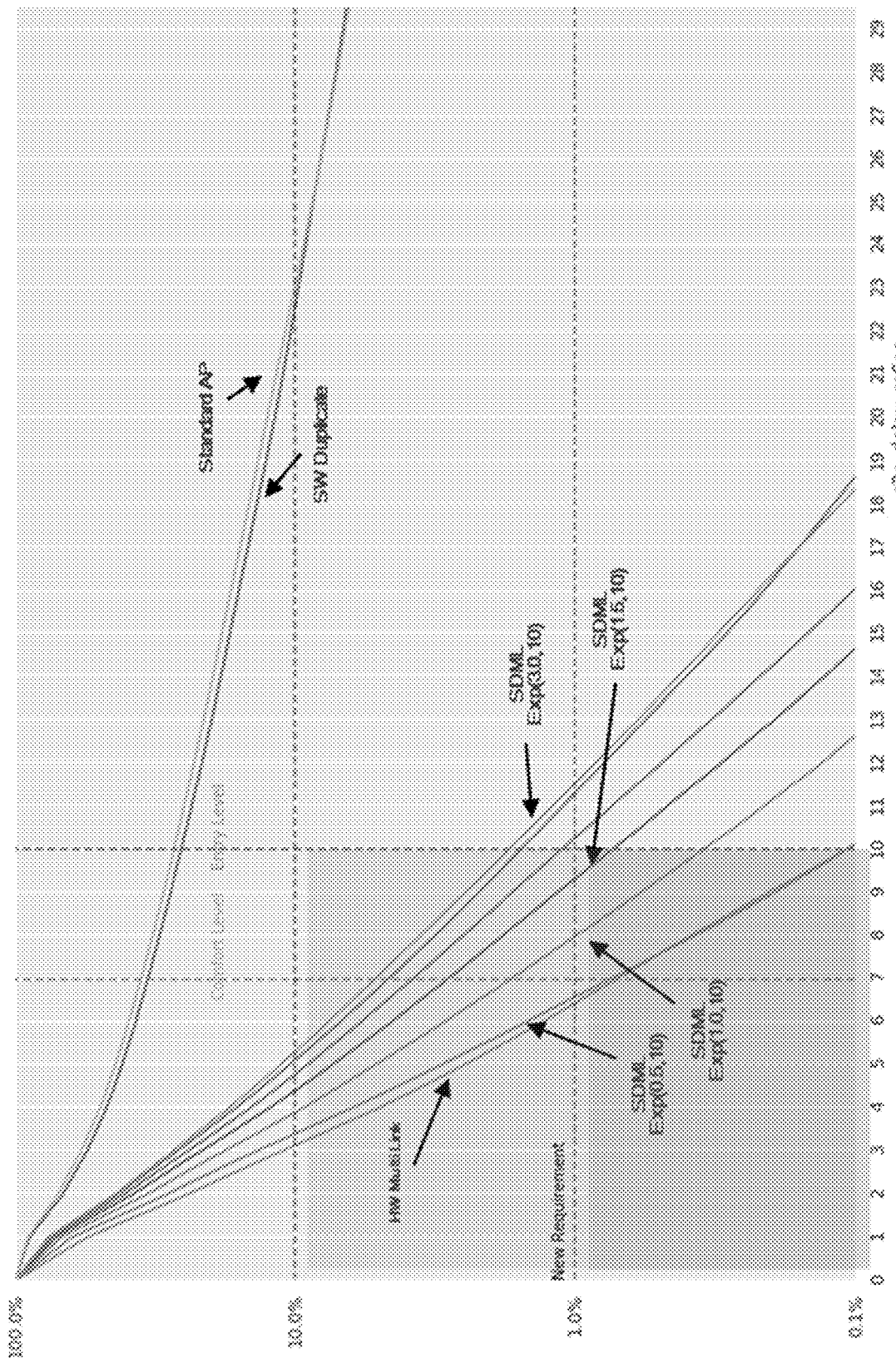
FIG. 9 shows a simulation result according to an embodiment of the disclosure.

Interference
- {50, 100, 125, 150, 175, 200}Mbps—variable bitrate (VBR) UDP VR Traffic
- MCS-5 (64-QAM 2/3), 2SS, 40/80 MHz->PHY rate 216/468 Mbps
- Tx Power 25 dBm FIG. 9 presents a simulation result of this SWML implementation. It can be easily noted that the SWML can be as efficient as hardware-based multi-link. Both Entry and Comfort levels @90% can be served even with Msg Queue delay off Exp distribution of 3 ms, it should provide enough margin for the required implementation. As shown in FIG. 9, in order to meet 99% requirements, the Msg Queue delay should not exceed Exp distribution with mean of 1.5 ms.

Figure 10:
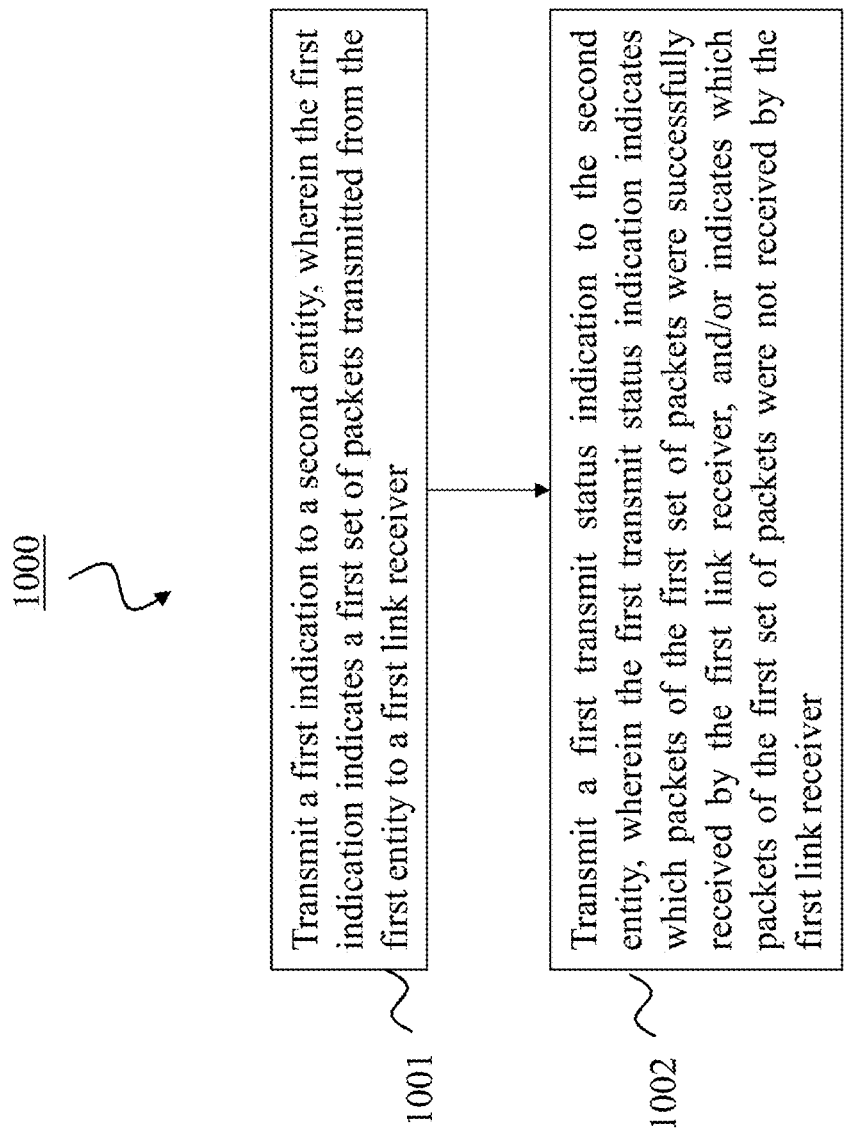
FIG. 10 shows a method according to an embodiment of the disclosure.

FIG. 10 shows a method 1000 according to an embodiment of the disclosure. In a particular embodiment of the disclosure, the method 1000 is performed by a first entity 100 shown in FIG. 1. The method 1000 comprises: a step 1001 of transmitting a first indication 101 to a second entity 200, wherein the first indication 101 indicates a first set of packets transmitted from the first entity 100 to a first link receiver 110; and a step 1002 of transmitting a first transmit status indication 102 to the second entity 200, wherein the first transmit status indication 102 indicates which packets of the first set of packets were successfully received by the first link receiver 110, and/or indicates which packets of the first set of packets were not received by the first link receiver 110. In particular, each packet indicated in the first indication 101 and the first transmit status indication 102 is associated with a global multi-link sequence number. Possibly, the second entity 200 is the second entity shown in FIG. 1 or FIG. 2.

Figure 11:
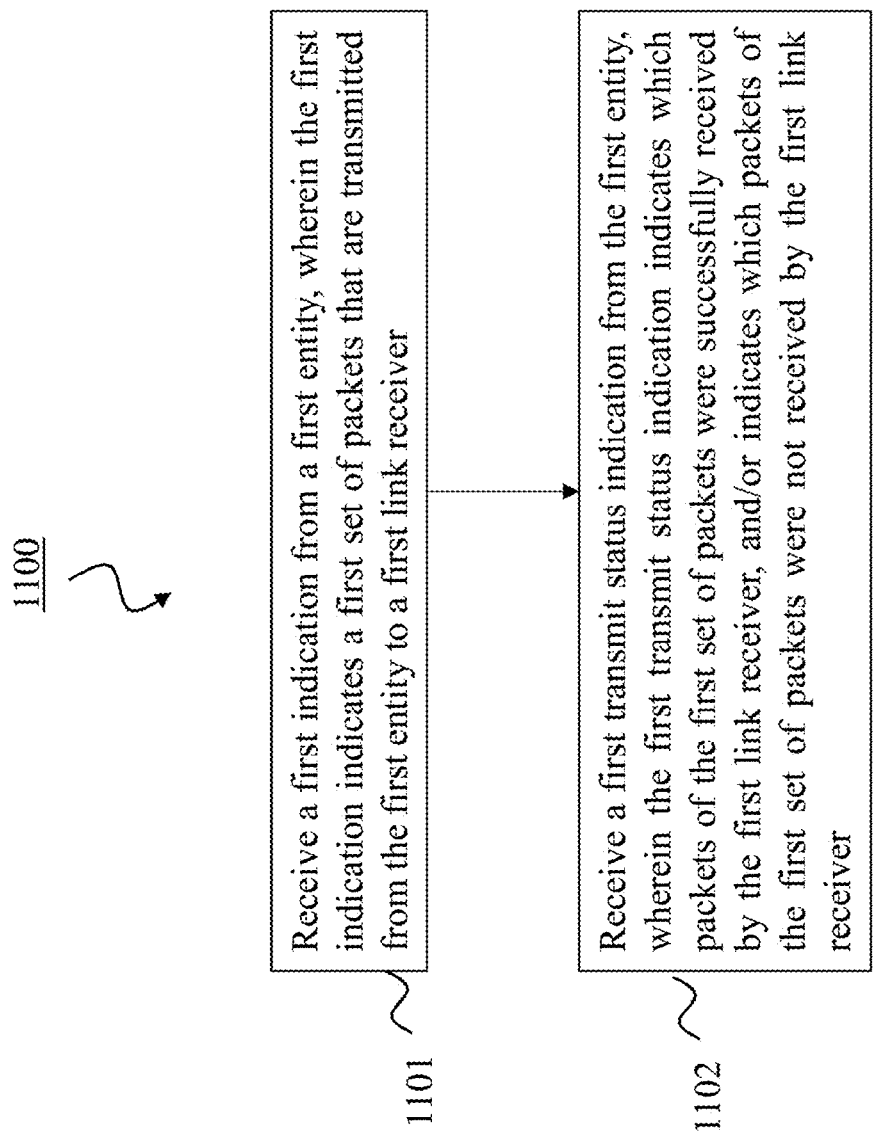
FIG. 11 shows a method according to an embodiment of the disclosure.

FIG. 11 shows a method 1100 according to an embodiment of the disclosure. In a particular embodiment of the disclosure, the method 1100 is performed by a second entity 200 shown in FIG. 2. The method 1100 comprises: a step 1101 of receiving a first indication 101 from a first entity 100, wherein the first indication 101 indicates a first set of packets that are transmitted from the first entity 100 to a first link receiver 110, and a step 1102 of receiving a first transmit status indication 102 from the first entity 100, wherein the first transmit status indication 102 indicates which packets of the first set of packets were successfully received by the first link receiver 110, and/or indicates which packets of the first set of packets were not received by the first link receiver 110. In particular, each packet indicated in the first indication 101 and the first transmit status indication 102 is associated with a global multi-link sequence number. Possibly, the first entity 100 is the first entity shown in FIG. 1 or FIG. 2.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

Furthermore, any method according to embodiments of the disclosure may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the first entity 100 and the second entity 200, respectively, comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, trellis-coded modulation (TCM) encoder, TCM decoder, power supply units, power feeders, communication interfaces, communication protocols, etc. which are suitably arranged together for performing the solution.

Especially, the processor(s) of the first entity 100 and the second entity 200, respectively, may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

What is claimed is:

1. A first entity for multi-link implementation in a wireless network, the first entity being configured to:
   obtain a sequence of packets to be transmitted to the first link receiver, wherein each packet of the sequence of packets is associated with a preset global multi-link sequence number;
   maintain a first transmit queue of the sequence of packets, wherein packets in the first transmit queue are to be transmitted to the first link receiver;
   transmit the first set of packets to the first link receiver, wherein the first set of packets is included in the sequence of packets in the first transmit queue, wherein each packet of the first set of packets comprises a wireless sequence number associated with the first entity, wherein the wireless sequence number for each packet is different from the preset global multi-link sequence number of the packet;
   transmit a first indication to a second entity, wherein the first indication indicates a first set of packets transmitted from the first entity to a first link receiver; and
   transmit a first transmit status indication to the second entity, wherein the first transmit status indication indicates which packets of the first set of packets were successfully received by the first link receiver, and/or indicates which packets of the first set of packets were not received by the first link receiver,
   wherein each packet indicated in the first indication and the first transmit status indication is associated with the corresponding preset global multi-link sequence number.

2. The first entity according to claim 1, further configured to:
   receive a first block acknowledgement, BA, from the first link receiver, wherein the first BA indicates which packets of the first set of packets were successfully received by the first link receiver, and/or indicates which packets of the first set of packets were not received by the first link receiver; and
   generate the first transmit status indication based on the first BA and the global multi-link sequence numbers associated with packets indicated in the first BA.

3. The first entity according to claim 2, wherein the first BA indicates which packets of the first set of packets were successfully received by the first link receiver, and/or indicates which packets of the first set of packets were not received by the first link receiver, by indicating the wireless sequence number associated with the first entity of each packet.

4. The first entity according to claim 1, further configured to:
   receive a second indication from the second entity, wherein the second indication indicates a second set of packets transmitted from the second entity to a second link receiver, wherein each packet indicated in the second indication is associated with a global multi-link sequence number, and the second set of packets is included in the sequence of packets; and based on the second indication, move the second set of packets from the first transmit queue to a first on-hold queue, wherein packets in the first on-hold queue are put on hold.

5. The first entity according to claim 4, further configured to:
   receive a second transmit status indication from the second entity, wherein the second transmit status indication indicates which packets of the second set of packets were successfully received by the second link receiver, and/or indicates which packets of the second set of packets were not received by the second link receiver;
   based on the second transmit status indication,
   release packets that were successfully received by the second link receiver from the first on-hold queue; and/or
   move packets that were not received by the second link receiver back to a front of the first transmit queue.

6. The first entity according to claim 1, wherein the first entity is implemented on a first chipset and the second entity is implemented on a second chipset different from the first chipset.

7. The first entity according to claim 6, wherein the first chipset and the second chipset are placed on the same wireless device.

8. The first entity according to claim 6, wherein the first chipset and the second chipset are placed on different wireless devices, and communicate with each other via a wired or wireless network backhaul connection.

9. The first entity according to claim 6, wherein the first chipset operates at a frequency that is different from the second chipset.

10. A second entity for multi-link implementation in a wireless network, the second entity being configured to:
    receive a first indication from a first entity, wherein the first indication indicates a first set of packets transmitted from the first entity to a first link receiver, wherein each packet of the first set of packets comprises a wireless sequence number associated with the first entity, wherein the wireless sequence number for each packet is different from a preset global multi-link sequence number of the packet; and
    receive a first transmit status indication from the first entity, wherein the first transmit status indication indicates which packets of the first set of packets were successfully received by the first link receiver, and/or indicates which packets of the first set of packets were not received by the first link receiver,
    wherein each packet indicated in the first indication and the first transmit status indication is associated with the corresponding preset global multi-link sequence number.

11. The second entity according to claim 10, further configured to:
    obtain a sequence of packets that need to be transmitted to a second link receiver, wherein each packet of the sequence of packets is associated with a global multi-link sequence number; and
    maintain a second transmit queue of the sequence of packets, wherein packets in the second transmit queue will be transmitted to the second link receiver.

12. The second entity according to claim 11, wherein the first set of packets is included in the sequence of packets, and the second entity is further configured to:

based on the first indication, move the first set of packets from the second transmit queue to a second on-hold queue, wherein packets in the second on-hold queue are put on hold.

13. The second entity according to claim 12, further configured to:
based on the first transmit status indication,
release packets that were successfully received by the first link receiver from the second on-hold queue; and/or
move packets that were not received by the first link receiver back to a front of the second transmit queue.

14. The second entity according to claim 11, further configured to:
transmit a second set of packets to the second link receiver, wherein the second set of packets is included in the sequence of packets;
receive a second BA from the second link receiver, wherein the second BA indicates which packets of the second set of packets were successfully received by the second link receiver, and/or indicates which packets of the second set of packets were not received by the second link receiver; and
generate a second transmit status indication based on the second BA and global multi-link sequence numbers associated with packets indicated in the second BA.

15. The second entity according to claim 14, wherein each packet of the second set of packets comprises a wireless sequence number associated with the second entity, wherein the wireless sequence number for each packet of the second set of packets is different from a preset global multi-link sequence number of the packet, and the second BA indicates which packets of the second set of packets were successfully received by the second link receiver, and/or indicates which packets of the second set of packets were not received by the second link receiver, by indicating the wireless sequence number of each packet.

16. The second entity according to claim 14, further configured to:
transmit a second indication to the first entity, wherein the second indication indicates the second set of packets transmitted from the second entity to the second link receiver; and
transmit the second transmit status indication to the first entity, wherein the second transmit status indication indicates which packets of the second set of packets were successfully received by the second link receiver, and/or indicates which packets of the second set of packets were not received by the second link receiver.

17. A wireless receiving device, the wireless receiving device comprising a first link receiver and a second link receiver, wherein the first link receiver is configured to receive packets from a first entity, and the second link receiver is configured to receive packets from a second entity,
the at least one first entity being configured to:
obtain a sequence of packets to be transmitted to the first link receiver, wherein each packet of the sequence of packets is associated with a preset global multi-link sequence number;
maintain a first transmit queue of the sequence of packets, wherein packets in the first transmit queue are to be transmitted to the first link receiver;
transmit the first set of packets to the first link receiver, wherein the first set of packets is included in the sequence of packets in the first transmit queue, wherein each packet of the first set of packets comprises a wireless sequence number associated with the first entity, wherein the wireless sequence number for each packet is different from the preset global multi-link sequence number of the packet;
transmit a first indication to the second entity, wherein the first indication indicates a first set of packets transmitted from the first entity to the first link receiver; and
transmit a first transmit status indication to the second entity, wherein the first transmit status indication indicates which packets of the first set of packets were successfully received by the first link receiver, and/or indicates which packets of the first set of packets were not received by the first link receiver,
wherein each packet indicated in the first indication and the first transmit status indication is associated with the corresponding preset global multi-link sequence number, and
the second entity being configured to:
receive the first indication from the first entity; and
receive the first transmit status indication from the first entity,
wherein the wireless receiving device is configured to:
obtain a receiving stream by combining the packets received by the first link receiver and the packets received by the second link receiver.

* * * * *